US009692692B1

(12) United States Patent
Vairavakkalai et al.

(10) Patent No.: US 9,692,692 B1
(45) Date of Patent: Jun. 27, 2017

(54) HIGH-SCALE DATA CENTER HAVING LSP TRANSPORT HIERARCHY

(71) Applicant: Juniper Networks, Inc., Sunnyvale, CA (US)

(72) Inventors: Kaliraj Vairavakkalai, Fremont, CA (US); Balaji Rajagopalan, Bangalore (IN); Chandrasekar Ramachandran, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 100 days.

(21) Appl. No.: 14/869,943

(22) Filed: Sep. 29, 2015

(51) Int. Cl.
*H04L 12/723* (2013.01)
*H04L 12/741* (2013.01)

(52) U.S. Cl.
CPC ............ *H04L 45/50* (2013.01); *H04L 45/745* (2013.01)

(58) Field of Classification Search
None
See application file for complete search history.

(56) References Cited

U.S. PATENT DOCUMENTS

| | | | |
|---|---|---|---|
| 4,953,506 A | 9/1990 | Sanders | |
| 6,205,252 B1 | 3/2001 | Nguyen et al. | |
| 7,184,437 B1 | 2/2007 | Cole et al. | |
| 9,007,941 B1 * | 4/2015 | Miclea | H04L 29/0621 370/252 |
| 9,106,581 B1 | 8/2015 | Mackie et al. | |
| 2008/0044181 A1 | 2/2008 | Sindhu | |

OTHER PUBLICATIONS

Rekhter et al., "Carrying Label Information in BGP-4," RFC 3107, May 2001, 8 pp.
Szarkowicz, krzysztof Grzegorz, and Monge, Antonio Sanchez, "IGP-Less Transport Scaling," MPLS in the SDN ERA: Interoperable Scenarios to Make Networks Scale to New Services, Nov. 18, 2015, Ch. 16, 7 pp.

* cited by examiner

*Primary Examiner* — Asad Nawaz
*Assistant Examiner* — Zhaohui Yang
(74) *Attorney, Agent, or Firm* — Shumaker & Sieffert, P.A.

(57) ABSTRACT

A high-performance, scalable data center switch fabric and infrastructure is described that provides a clean separation between of routing and forwarding information between a transport layer of the data center and a service layer of data center that includes the endpoint devices, such as virtual or physical machines deployed within the data center. For example, techniques are described that enable the automatic creation of a transport hierarchy of label switched paths (LSPs) across the transport layer of the data center. For example, the techniques may be applied with the Border Gateway Protocol (BGP) labeled unicast (LU) in a manner that constructs a hierarchy of LPSs in the transport layer of the data center.

16 Claims, 4 Drawing Sheets

HIGH-SCALE DATA CENTER HAVING LSP TRANSPORT HIERARCHY

TECHNICAL FIELD

The invention relates to computer networks and, more particularly, routing traffic within data centers.

BACKGROUND

In a typical cloud-based data center, a large collection of interconnected servers provides computing and/or storage capacity for execution of various applications. For example, a data center may comprise a facility that hosts applications and services for subscribers, i.e., customers of data centers. The data center may, for example, host all of the infrastructure equipment, such as networking and storage systems, redundant power supplies, and environmental controls. In most data centers, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Typical data centers host thousands or millions of virtual machines executing on servers that are interconnected by a large transport network that provides point-to-point connectivity between the virtual machines. For example, many data centers are now using layer three (L3) technologies, such as an Internet Protocol (IP) underlay to tunnel packet-based communications between virtual machines. Due to the massive number of virtual machines and servers that may be deployed in a conventional data center, the transport network must store and process significant volumes of routing and forwarding information. Moreover, conventional L3 aggregation techniques, such as aggregation of IP prefixes, is maintained in the routing information throughout the data center and tends to be fairly unworkable in large-scale data centers for many reasons, such as continual migration of virtual machines between prefixes or regions within the data center.

SUMMARY

In general, this disclosure describes a high-performance, scalable data center switch fabric and infrastructure that provides a clean separation of routing and forwarding information between a transport layer of the data center that includes the internal routing and switching components and a service layer of the data center that includes the endpoint devices, such as virtual or physical machines deployed within the data center.

For example, techniques are described that enable the automatic creation of a transport hierarchy of label switched paths (LSPs) across the transport layer of the data center. For example, the techniques may be applied with the Border Gateway Protocol (BGP) labelled unicast (LU) in a manner that constructs a hierarchy of LSPs in the transport layer of the data center. Nodes within the service layer maintain reachability information for other nodes within the service layer, such as reachability information for server or virtual machine addresses or prefixes.

In one example, a system comprises a data center comprising a service layer having compute nodes and a transport layer having a plurality of routers that provide point-to-point connectivity between the compute nodes, wherein the transport layer is partitioned into a plurality of regions, each of the regions assigned a respective community attribute. Interior routers of the transport layer are configured to executing a border gateway protocol (BGP) labeled unicast (LU) protocol to exchange route advertisements specifying BGP-LU routes, each of the BGP-LU routes specifying a destination address of one of the router that originated the route advertisement, a Multiprotocol Label Switching (MPLS) label, a next hop for reaching the originating router, and a community attribute identifying a region within the data center in which the originating router is located. Moreover, each of the routers within the transport layer is configured to construct a hierarchy of label switched paths (LSPs) within the transport layer by modifying the BGP-LU routes and re-advertising the modified BGP-LU routes when the region identified by the community attribute specified by the BGP-LU route advertisement matches a region in which the re-advertising router is located. For example, the routers are configured to modify the BGP-LU advertisement by rewriting the label specified within the route advertisement with a label allocated by the re-advertising router and rewriting the next hop within the route advertisement to a network address assigned to the re-advertising router In one example, a method comprises receiving, by a first router within a data center, a route advertisement for a labeled unicast (LU) route that specifies a destination address of a second router within the data center that originated the LU, a Multiprotocol Label Switching (MPLS) label and next hop data for reaching the second router, wherein the LU route further specifies a community attribute identifying a region within the data center in which the second router is located. The method includes, responsive to determining that region identified by the community attribute specified by the LU route matches a region in which the first router is located, allocating a label with the first router and modifying the route advertisement by rewriting the label specified within the route advertisement with the label allocated by the first router and rewriting the next hop data within the route advertisement to a network address assigned to the first router. The method further includes re-advertising, with the first router, the modified route advertisement within the data center.

In another a transport router of a transport layer within a data center comprises a control unit having at least one processor coupled to a memory, and a forwarding component configured to forward packets within the data center. The control unit is configured to receive a route advertisement for a labeled unicast (LU) route that specifies a destination address of a second router within the data center that originated the LU, a Multiprotocol Label Switching (MPLS) label and next hop data for reaching the second router, wherein the LU route further specifies a community attribute identifying a region within the data center in which the second router is located. The control unit is further configured to, responsive to determining that region identified by the community attribute specified by the LU route matches a region in which the first router is located, allocate a label, rewrite the label specified within the route advertisement with the allocated label, rewrite the next hop data within the route advertisement to a network address assigned to the router, and re-advertise the modified route advertisement within the transport layer of the data center.

The details of one or more embodiments of the invention are set forth in the accompanying drawings and the description below. Other features, objects, and advantages of the invention will be apparent from the description and drawings, and from the claims.

DESCRIPTION

Figure 1:
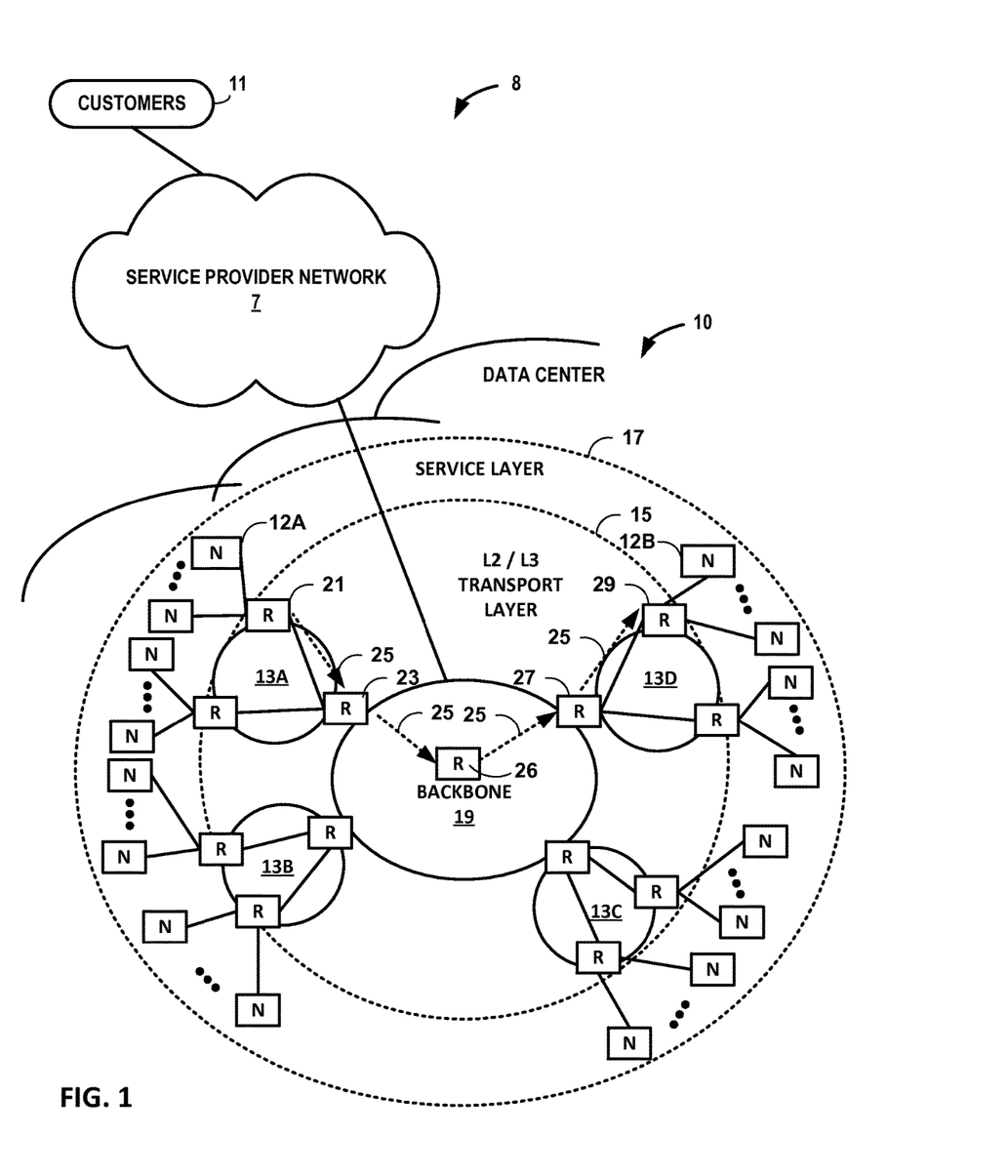
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a service layer 17 having a set of compute nodes (N) interconnected via high-speed transport layer 15 provided by one or more regions of physical network switches and routers. Compute nodes N provide execution and storage environments for applications and data associated with customers 11 and may be physical servers, virtual machines or combinations thereof.

Transport layer 15 represents layer two (L2) and layer three (L3) switching and routing components that provide point-to-point connectivity between compute nodes 12. In the example of FIG. 1, transport layer 15 is partitioned into multiple regions. In particular, each of regions 13A-13D includes a set of routers (R) that connect a respective set of compute nodes N to a backbone region 19. Although not shown, data center 10 may also include, for example, one or more non-edge switches, top-of-rack switches, routers, hubs, gateways, security devices such as firewalls, intrusion detection, and/or intrusion prevention devices, application accelerators, or other network devices.

Techniques are described herein that provide a clean separation of routing and forwarding information maintained within transport layer 15 that includes the internal routing and switching components for data center 10 and service layer 17 containing compute nodes 12, such as virtual or physical machines deployed within the data center.

For example, as described herein, techniques are described that enable the automatic creation of a transport hierarchy of label switched paths (LSPs) across transport layer 15 of the data center using routing protocols. For example, each router within transport layer 15 may be configured as its own autonomous system such that each router communicates with each other neighbor router using the exterior Border Gateway Protocol (eBGP) without, for example, executing an interior gateway routing protocol (IGP). Moreover, each router may utilize Border Gateway Protocol (BGP) labeled unicast (LU) to exchange Multiprotocol Label Switching (MPLS) labels for formulating label switched paths (LSPs).

The techniques described herein may be applied so as to automatically construct a hierarchy of BGP LU LSPs in transport layer 15 of data center 10. As such, each individual routing node R within transport layer 15 need not maintain reachability information for other routing nodes within different regions 13 or backbone 19 of transport layer 15. That is, as one example, the techniques enable a hierarchy between different BGP-LU layers. Further, compute nodes N within service layer 17 are decoupled from BGP-LU running in the transport layer 15 and, instead, utilize a lighter control plane to program their forwarding state. As such, compute nodes N within service layer 17 maintain reachability information for other compute nodes within the service layer, such as reachability information for addresses or prefixes of other compute nodes within the service layer. In other words, compute nodes N need not maintain forwarding information for routers R internal to transport layer 15. Although described with respect to BGP-LU for purposes of example, other MPLS LSP protocols may be used. Further example details of BGP-LU are described in Rekhter et. al. "Carrying Label Information in BGP-4," RFC 3107, Internet Engineering Task Force (IETF), May 2001, hereby incorporated herein by reference.

As described herein, transport layer 15 of data center 10 is partitioned in regions, such as regions 13 and backbone 19 in the example of FIG. 1. Moreover, a unique BGP standard community identifies each region. As such, in one example implementation, each router R is logically considered to belong to a region set, which consists of one or more regions. For example, the region set for router 21 is {REGION 13A}, whereas the region set for router 23 is {REGION 13A and BACKBONE 19}. Further, each region set has an associated regional community set. For example, the regional community set for router 21 can be defined as {CM-ZONE-13A, CM-ZONE-19}, where CM-ZONE-13A, CM-ZONE-19 represent distinct BGP communities. As a second example implementation, each router may be considered reside within a single region but so-called border links between regions are considered to belong to a region set of multiple regions or otherwise define the partition between regions. For purposes of example, the techniques will be described with respect to the first example implementation but may readily be applied to the second example implementation.

In either example implementation, when constructing and outputting a BGP-LU advertisement, the advertising router R includes, for example, a local loopback address of the advertising router, a protocol next hop for the LSP such as a public IP address of an interface of the advertising router, a locally meaningful label allocated by the advertising router and one or more BGP communities representing the region(s) of transport layer 15 in which the advertising router participates.

Moreover, in accordance with the techniques described herein, each of routers R is configured to operate to apply a selectively "next-hop-self" policy when re-advertising BGP- LU routes within transport layer 15 by automatically rewriting the next hop advertised within the route based on whether the route originated from within the same region 13 or backbone 19 as the re-advertising router R. That is, in accordance with the techniques described herein, each of the routers R in transport layer 15 apply a next-hop-self policy to rewrite the next hop to point to the routers own interface and to use a label locally relevant to the re-advertising router only when re-advertising routes that originated within the same region 13, or backbone 19. Each of the routers R refrains from rewriting the interface address and the label advertised within a given route when re-advertising a route that originated from a different region 13 or backbone 19. In other words, in accordance with the techniques described herein, router R may be viewed as applying a "nexthop-unchanged in all regions except the originating-region" policy, which enables reduction of MPLS FIB state in each region of data center 10.

For example, when router R 21 advertises route 25 that specifies a specific destination (for example, its own loopback address) into the BGP-LU routing domain, router R is considered to be the originator of the route. At this time, the originating router R 21 adds to route 25 all the communities from the routers regional community set. Since router R 23 and router R 21 share region 13A, router R 23 has at least one community attribute matching the regional community set of router R 21. As such, when re-advertising BGP-LU route 25 toward backbone 19, router R 23 considers the route as intra-region, i.e., being sourced within the same region as router R 23. As such, router R 23 rewrites the route's BGP next hop of the route to a local address of router R 23. In contrast, when re-advertising route 25, router R 27 has no single community matching the regional community set of router R 21. As such, router R 27 considers route 25 to be inter-region and does not rewrite the route's BGP NH.

In addition to processing BGP-LU route advertisements to exchange labels within transport layer 15 and automatically constructing a hierarchical BGP-LU LSP architecture, routers R bordering service layer 17 (e.g., routers R 21 and R 29) establish eBGP IP peer relationships to exchange eBGP IPv4 (or IPv6) unicast routes. The eBGP IPv4 unicast routes advertise reachability information (e.g., IP addresses of the routers) for IP addresses of compute nodes reachable through the routers.

As such, the techniques enable a clean separation of routing and forwarding information between transport layer 15 of data center 10 and service layer 17 of the data. The techniques enable the automatic creation of a transport hierarchy of label switched paths (LSPs) across transport layer 15 of data center 10. Moreover, the techniques avoid the explosion of label information within transport layer 15 where labels would otherwise be flooded to all routers R within data center 10 so as to provide point-to-point connectivity between compute nodes 12. Further, compute nodes 12 within service layer 17 are fully decoupled from the BGP-LU forwarding information and need not store transport label information.

Figure 2:
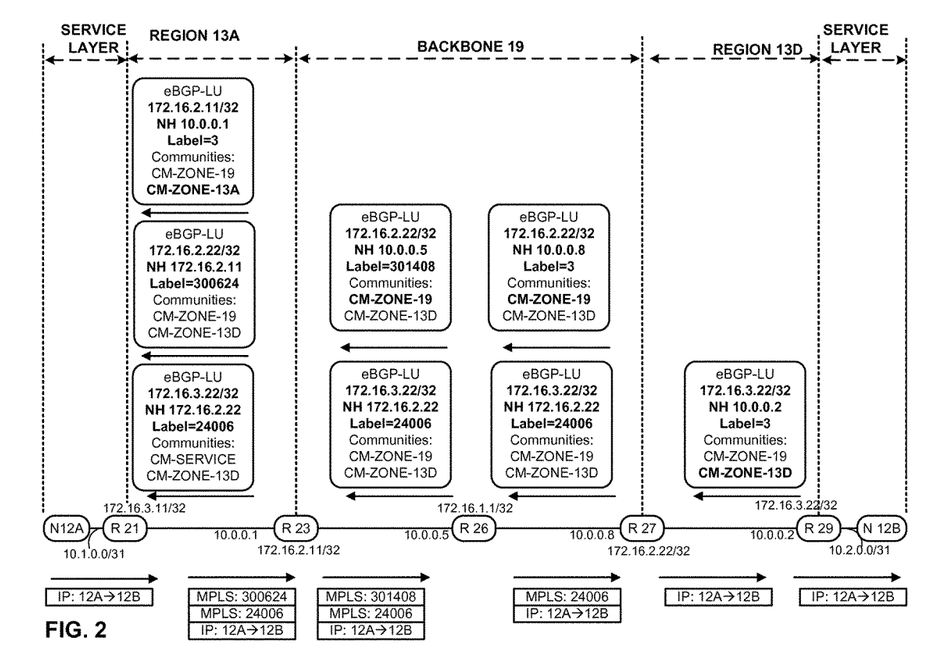
FIG. 2 is a diagram illustrating example advertisement of routing information and packet forwarding within the network of FIG. 1 in accordance with the techniques described herein.

FIG. 2 is a diagram illustrating a more detailed example of the operation of the devices of FIG. 1 in accordance with the techniques described herein. That is, FIG. 2 illustrates example processing of BGP-LU advertisements within transport layer 15. In the example of FIG. 2, route advertisements flow from right to left while traffic flows from left to right from compute node N 12A to compute node N 12B.

As a first example, router R 29 coupled to node 12B in service layer 17 originates an eBGP-LU route 172.16.3.22, where 172.16.3.22 is the local loopback IP address of the router. Router R 29 constructs and outputs the route to specify its local loopback address of 172.16.3.22, a protocol next hop for the LSP as 10.0.0.2, which is a public IP address of an interface of the advertising router R 29, a locally meaningful label (LABEL 3) allocated by the advertising router and the BGP communities representing the region(s) of the transport layer in which the advertising router participates. In this example, the region set for originating router R 29 is {REGION 13D} having a single regional community of: CM-ZONE-13D.

Router R 27 receives and processes the BGP-LU route as described herein. In this example, router R 27 belongs to both region 13D and backbone 19. Because router R 27 has at least one region in common (region 13D) with the originating router R 29, router R 27 automatically rewrites the BGP next hop of route 172.16.3.22 to replace the protocol next hop address of 10.0.0.2 with its own loopback address (172.16.2.22) and allocates a locally significant label 24006. Router R 27 forwards the modified BGP-LU route 172.16.3.22. None of the other routers (R 26, R 23 R 21) belongs to region 13D, so all of the routers for the BGP-LU route without modification to the BGP next hop or the label allocated by router R 27. As such, a first hop-by-hop BGP-LU LSP is established from router R 29 to router R 21.

As another example, router R 27 originates eBGP-LU route 172.16.2.22, whose region set is {BACKBONE 19, REGION 13D}. As a result, the route has two regional communities: CM-ZONE-19 and CM-ZONE-13D. In this example, router R 27 originally allocates a locally significant label 3 (LABEL 3) and sets the protocol next hop for the route to 10.0.0.8. As the route is propagated in backbone 19, router R 26 belongs to backbone region 19; hence, it rewrites the BGP next hop of the route to the eBGP peering address 10.0.0.5 and allocates a locally significant label 301408. Router R 23 also belongs to backbone 19; hence, the router rewrites the BGP next hop of the route to its own loopback address (172.16.2.11) and allocates a new label 300624 when re-advertising the route into region 13A. In this way, router R 26 and router R 23 are configured to apply a different BGP next hop rewrite operation that depends on whether the route is being re-advertised within the same region or to a region different from the source. In this example, router R 23 is advertising the route to a peer that, from the perspective of router R 23, is in region 13A. Since the route's region set is {backbone 19, region 13D}, router R 23 determines that the route re-advertisement is an inter-region advertisement and, therefore, re-writes the BGP next hop of the route with its own loopback address.

As another example of the route advertisement operations within transport layer 15, router R 23 originates an eBGP-LU route 172.16.2.11. Since router R 23 and router R 21 are directly connected, this intra-region LSP within region 13A has no label due to Penultimate Hop Popping (PHP). If additional routers existed between router R 23 and router R 21, additional labels for this LSP would be allocated such that a three-label stack just for transport through backbone 19, i.e., one for each of the above-described routes.

In addition to the BGP-LU route advertisements within transport layer 15, as illustrated by the examples of FIG. 2, edge router R 29 outputs an eBGP IPv4 (or IPv6) unicast route (i.e., a non-BGP-LU route) through a BGP peering session with edge router R 21. This eBGP IPv4 unicast route advertises IP address 10.2.0.0/31 of compute node 12B and a next hop of 172.16.3.22, i.e., the IP address of router R 29.

Based on the above advertisements, traffic flow is fully enabled from compute node 12A to compute node 12B. The lower portion of FIG. 2 shows traffic flowing from left to right from compute node 12A to compute node 12B and, in particular, shows the header/label stack of the packets that would be utilized in response to the above-described routes. As shown, compute node 12A sources a packet having an IP header listing the destination IP address of compute node 12B and the source IP address of compute node 12A.

Upon receiving the packet at router R 21, the router pushes a two label stack {300624, 24006} to encapsulate the IP packet and inject the tunnel packet into transport layer 15 for forwarding to node 12B. In particular, at this time router R 21 applies recursive BGP-LU route lookups to determine the entire label stack necessary for reaching destination IP address 10.2.0.0/31. For example, based on the IP destination address 10.2.0.0 of the packet, router R 21 performs an initial route lookup within the IP forwarding information base (FIB) and determines, based on the eBGP IP routes, that the address 10.2.0.0 is reachable by router R 29 having an IP address of 172.16.3.22. Next, router R 21 recursively accesses forwarding information associated with the eBGP-LU routing table to build the label stack for transporting the packet through transport service layer 15. That is, router R 21 accesses forwarding information associated with its BGP-LU routing table to perform a route lookup with a destination FEC of 172.16.3.22 and retrieves label 24006, which was actually advertised by router R 27 using the techniques described herein to rewrite the label when re-advertising the route to router R 29. Next, router R 21 accesses forwarding information associated with its BGP-LU routing table to perform a route lookup to retrieve the route for reaching router R 27 (i.e., route 172.16.2.22/32) and retrieves label 300624 as rewritten by router R 23 when re-advertising the route. Finally, router R 21 accesses forwarding information associated with its BGP-LU routing table to perform a route lookup to retrieve the route for reaching router R 23 (i.e., route 172.16.2.22/32) and retrieves next hop information without a label since, as explained above, in this example there is no label associated with this LSP due to PHP.

Based on this recursive lookup process, router R 21 constructs the tunnel packet to have an outer MPLS label of 300624 and an inner MPLS label of 24006 and a payload carrying the original IP packet output by compute node 12A. Router R 21 outputs the tunnel packet for forwarding through transport layer 15 and delivery to compute node 12B.

For example, upon receiving the tunnel packet, router R 23 performs a label swap operation to swap the outer label with label 301408 as advertised by router R 26 of backbone 19. Upon receiving the packet, router R 26 performs Penultimate Hop Popping and pops the outer label and forwards the tunnel packet to router R 27. Upon receiving the tunnel packet, router R 27 similarly performs Penultimate Hop Popping so as to expose the IP packet and forwards the IP packet to router R 29 for routing to compute node 12B using its forwarding information associated with its BGP IPv4 routing table.

In this way, the techniques provide significant scaling benefit at the forwarding plane level. For example, neither router R 23 nor router R 26 need to allocate a label for the route associated with reaching the loopback address of router R 29. In other words, according to the techniques, the label switched routers (LSRs) within transport layer 15 need only allocate labels for prefixes originated in their own region set. A large-scale data center with more than 100,000 servers, for example, no longer requires LSRs to allocate and maintain forwarding state information more than 100,000 labels. In general, each label allocation requires a FIB entry. As such, the techniques may significantly reduce the size of the forwarding information bases (FIBs) within the forwarding plane of routers R of transport layer 15.

The following example output shows the recursive routes as installed in the BGP-LU routing table of router R 21 (table inet 3 in this example), where the BGP community attributes are represented by numerical identifiers associated with the text identifiers in the example above:

juniper@ROUTER21> show route receive-protocol bgp
        10.0.0.1 table inet.3 detail inet.3: 12 destinations, 12
        routes (11 active, . . . ) [ . . . ]
      * 172.16.2.11/32 (1 entry, 1 announced)
      Accepted
      Route Label: 3
      Nexthop: 10.0.0.1
      AS path: 65201 I
      Communities: 65000:1000 65000:1001
      * 172.16.2.22/32 (1 entry, 1 announced)
      Accepted
      Route Label: 300624
      Nexthop: 172.16.2.11
      AS path: 65201 65101 65202 ?
      Communities: 65000:1000
      * 172.16.3.22/32 (1 entry, 1 announced)
      Accepted
      Route Label: 24006
      Nexthop: 172.16.2.22
      AS path: 65201 65101 65202 65302 ?
      Communities: 65000:3 65000:1002

In this way, the hierarchical transport LSP is ready at the ingress router R 21. The following example output illustrates forwarding next-hop information installed within the BGP-LU FIB (table inet 3):

juniper@ROUTER21> show route 172.16.3.22 table
      inet.3
      inet.3: 12 destinations, 12 routes (11 active, . . . )
      [ . . . ]
      172.16.3.22/32 *[BGP/170] 02:01:28, localpref 10
      AS path: 65201 65101 65202 65302 ?
      > to 10.0.0.1 via ge-2/0/2.0,
      Push 24006, Push 300624(top)

In this example, the MPLS service is global (i.e., no VPN) IPv4 unicast. In other examples, a VPN or other service is provided between compute nodes 12, which would utilize another (service) label within the label stack. The service IP unicast route in this example is 10.2.0.0/31, and its BGP next hop (172.16.3.22) has already been resolved, so compute node 12B is now reachable from compute node 12A. This prefix exchange is described above with respect to the BGP IP route exchange between routers R 21 and R 29. The following example output shows example forwarding information within the BGP IP FIB (table inet.0 in this example) of router R 21:

juniper@ROUTER21> show route receive-protocol bgp
      172.16.1.1 detail inet.0: 11 destinations, 11 routes (10
      active, . . . )
      * 10.2.0.0/31 (1 entry, 1 announced)
      Accepted
      Nexthop: 172.16.3.22
      AS path: 65101 65302 ?
      Communities: 65000:100
    juniper@ROUTER21> show route 10.2.0.0/31 table
      inet.0
      inet.0: 11 destinations, 11 routes (10 active, . . . )
      10.2.0.0/31 *[BGP/170] 00:32:11, localpref 100, from
      172.16.1.1

AS path: 65101 65302 ?
> to 10.0.0.1 via ge-2/0/2.0,
Push 24006, Push 300624(top)

In example implementations, hierarchical BGP-LU LSPs can be configured using typical BGP-LU configuration data without requiring extensions or modification to the protocol. The following example configuration data illustrates example configuration of one eBGP-LU session at router R 23.

```
protocols {
  bgp {
    group eBGP-LU-65301 {
      multihop {
        no-nexthop-change;
      }
      export PL-eBGP-LU-OUT-REGION-13A;
}}}
policy-options {
  policy-statement PL-eBGP-LU-OUT-REGION-1 {
    term LOCAL-LOOPBACK {
      from interface lo0.0;
      then {
        community add CM-REGION-BACKBONE;
        community add CM-REGION-13A;
        accept;
      }
    }
    term REGION-0 {
      from community CM-REGION-BACKBONE;
      then {
        next-hop 172.16.2.11;
}}}
  community CM-REGION-0 members 65000:1000;
  community CM-REGION-1 members 65000:1001;
}
```

In this example, router R 23 is configured to rewrite the BGP next hop of the 172.16.2.22/32 route to L1's loopback address 172.16.2.11 before advertising the route to router R 21. The no-nexthop-change configuration text label is used to direct the router to not change the BGP NH unless the export policy explicitly changes it.

Figure 3:
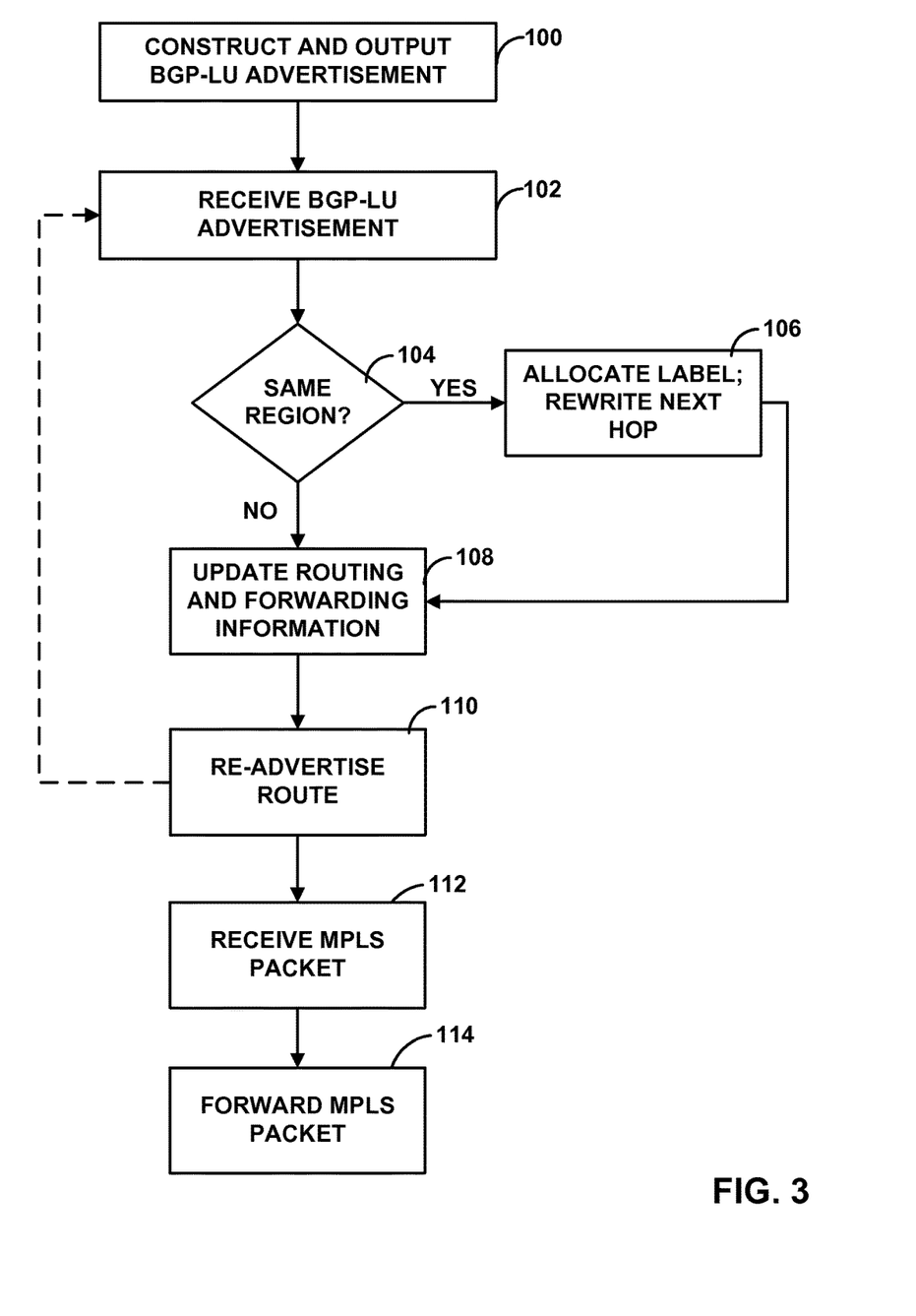
FIG. 3 is a flowchart illustrating example operation of a router according to techniques described in this disclosure.

FIG. 3 is a flowchart illustrating example operations of a router in accordance with techniques of the disclosure. For purposes of example, FIG. 3 is described with respect to router 200 in the example where the router is positioned within a transport layer of a data center, such as routers R 23, R 26 and R 27 of transport layer 15.

As described herein, the router implements exterior Border Gateway Protocol (eBGP) labeled unicast (LU) to exchange labels for formulating one-hop LSPs. As such, router 200 constructs and outputs to peer routers within its region a BGP-LU advertisement specifying a BGP-LU route (100). The BGP-LU route includes, for example, a local loopback address of the advertising router 200, a protocol next hop for the LSP such as a public IP address of an interface of the advertising router, a locally meaningful label allocated by the advertising router and one or more BGP communities representing the region(s) of the transport layer in which the advertising router participates.

In addition, router 200 typically receives BGP-LU advertisements from the other routers within transport layer 15 (102). Upon receiving BGP-LU advertisements, the router 200 selectively rewrites next hop data carried by the BGP-LU routes when re-advertising the routes within transport layer 15. That is, router 200 analyzes the community attributes carried by each of the routes to determine whether the route originated from within the same region as the re-advertising router 200 (104). If so, router 200 modifies the BGP-LU route advertisement to rewrite the next hop data to specify the router's own local loopback interface and to use a label allocated by router 200 and locally relevant to the router (106). If the BGP-LU route advertisement does not originate from the same region of transport layer 15 as router 200, the router does not apply the "next-hop-self" operation and does not allocate a new label.

Next, router 200 updates its local BGP-LU routing information and its forwarding information to reflect the next hop and label for the BGP-LU route (108) and re-advertises the BGP-LU route to other BGP routers within the data center 10 (110). At this point, router 200 is configured to receive and forward packets having header information, e.g., BGP-LU labels, associated with the advertised route (112, 114).

Figure 4:
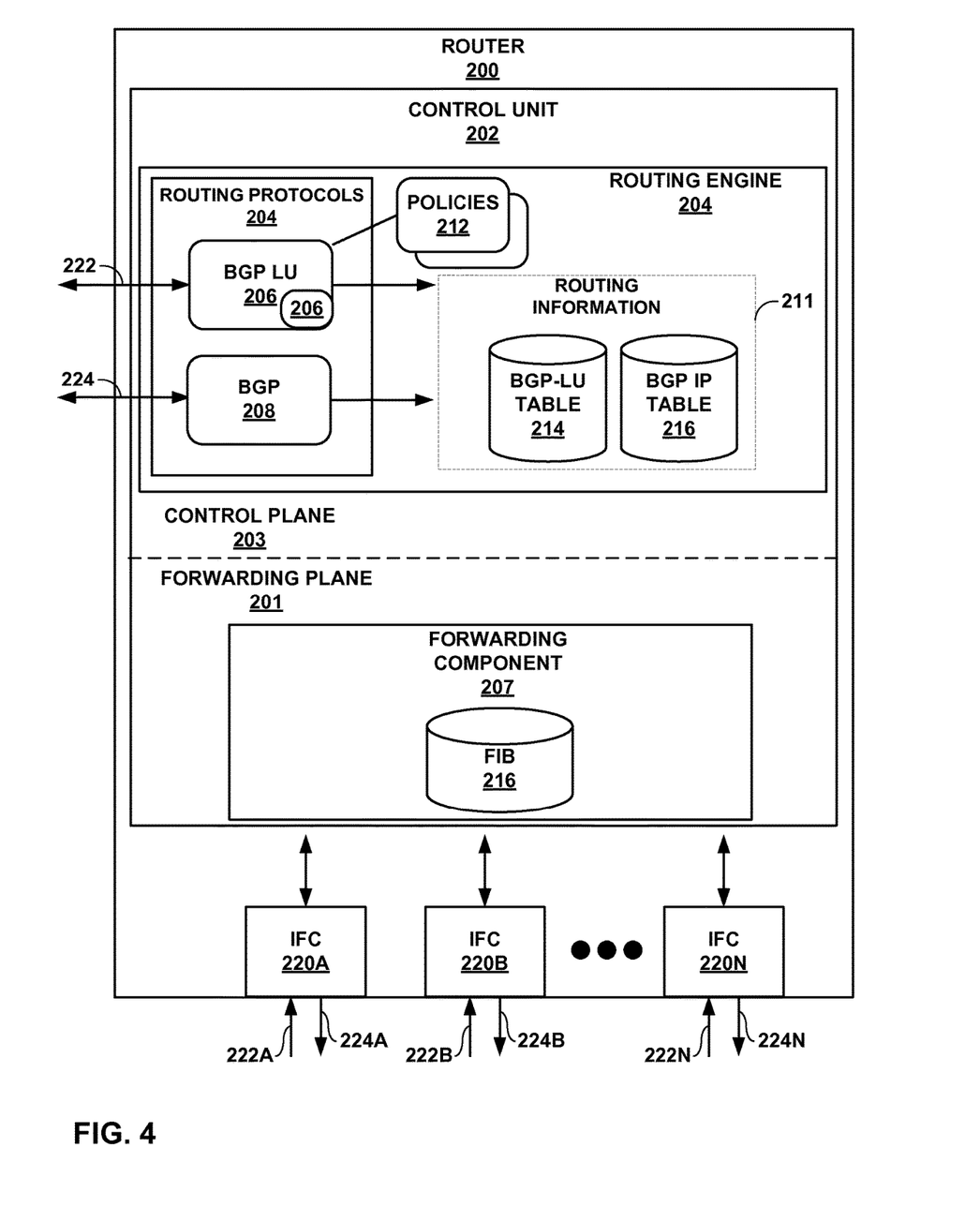
FIG. 4 is a block diagram illustrating further details of an example router in accordance with techniques of the disclosure.

FIG. 4 is a block diagram illustrating an exemplary router 200 capable of performing the disclosed techniques. In general, router 200 may operate substantially similar to routers R as described with respect to FIGS. 1-3.

In the example of FIG. 4, router 200 includes a control unit 202 that comprises a control plane 203 having routing engine 204 and a forwarding plane 201 having forwarding component 207. In addition, router 200 includes a set of interface cards (IFCs) 220A-220N (collectively, "IFCs 220") for communicating packets via inbound links 222A-222N (collectively, "inbound links 222") and outbound links 224A-224N (collectively, "outbound links 224"). Router 200 may also include a switch fabric (not shown) that couples IFCs 220 and forwarding component 207.

Forwarding component 207 represents hardware and logic components that provide high-speed forwarding of network traffic. Forwarding component 207 typically includes one or more packet forwarding engines (PFEs) that each include a set of one or more forwarding chips programmed with forwarding information (FIB) 216 that maps network destinations with specific next hops and the corresponding output interface ports. In general, when router 200 receives a packet via one of inbound links 222, forwarding component 207 identifies an associated next hop for the data packet by traversing forwarding information 216 based on information within the packet. Forwarding component 207 forwards the packet on one of outbound links 224 mapped to the corresponding next hop in accordance with forwarding information 216. U.S. Patent Application 2008/0044181, entitled MULTI-CHASSIS ROUTER WITH MULTI-PLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In this example, control plane 203 of router 200 provides an operating environment for executing one or more routing protocol software processes 204 that implement interior and exterior routing protocols to exchange routing and other traffic engineering information with other network devices. In some instances, responsibility for executing various routing protocols may be allocated among respective processes. That is, in this example, routing engine 204 operates as the control plane for router 200 and includes an operating system that provides a multi-tasking operating environment for execution of a number of concurrent processes. Routing engine 204, for example, typically includes one or more microprocessors that execute software instructions to implement one or more control plane networking protocols 204.

In general, routing information 211 describes a topology of the computer network in which router 200 resides, and may also include routes through the network. Routing information 211 describes various routes within the computer network, and the appropriate next hops for each route, i.e., the routing devices along each of the routes.

In one example router 200 may, for example, be configured to operate as an edge router that couples transport layer 15 and service layer 17, such as routers R 21 and R 29. In this example, as shown, routing protocols 204 includes BGP-LU protocol 206 and BGP protocol 208 for exchanging BGP IP routes 224 and BGP-LU routes 222 with other routing devices. Although shown as separate protocols, BGP-LU 206 and BGP 208 may be implemented as a single process or protocol.

In this example, BGP-LU protocol 206 and BGP protocol 208 store routing information in BGP-LU tables 214, 216, respectively. BGP-LU table 214 and BGP IP table 216 correspond, for example, to NET table.3 and INET table.0 in the examples described above. That is, INET.0 table (BGP IP table 216) is used to store IP unicast routes including interface local and direct routes, static routes, and dynamically learned routes. INET.3 is used to store MPLS routes including, for example, next hop information, label information, and community information. Routing engine 204 applies the recursive route resolution to tables 214, 216 described herein to determine the label stack for routing packets across transport layer 15.

In another example, router 200 may be configured to operate as a router R within transport layer 15, such as routers R 23, R 26 and R 27. In this example, router 200 need not necessarily include BGP protocol 208 for exchanging IP routes. Moreover, BGP-LU protocol 206 includes selective next hop re-route logic 206 that selectively rewrites next hop information for BGP-LU routes as controlled by route export policies 212 when re-advertising the routes within transport layer 15. For example, route export policies 212 may configure next hop re-rewrite logic 206 as described herein to apply a selective "next-hop-self" policy when re-advertising BGP-LU routes with transport layer 15 by selectively rewriting the next hop advertised within the route based on whether the route originated from within the same region as the re-advertising router 200. However, in accordance with the techniques described herein, route export policies 212 direct next hop rewrite logic 206 to only rewrite the next hop to point to the routers own interface and to use a label locally relevant to the re-advertising router only when re-advertising routes that originated within the same region. In other words, route export policies 212 control next hop rewrite logic 206 to not rewrite the interface address and the label advertised within the route when re-advertising routes that originated from a different region.

In general, routing engine 204 analyzes stored routing information 211 and generates FIB 216 for forwarding component 207. FIB 216 may associate, for example, network destinations for subscribers with specific next hops and corresponding IFCs 220 and physical output ports for output links 224. Moreover, FIB 216 may specify operations, such as encapsulation with MPLS tags, de-encapsulation of packets, packet header rewrite, label swapping operations, to be applied when forwarding packets to the next hops. FIB 216 may be a radix tree programmed into dedicated forwarding chips, a series of tables, a complex database, a link list, a radix tree, a database, a flat file, or various other data structures. U.S. Pat. No. 7,184,437, entitled "SCALABLE ROUTE RESOLUTION," provides details on an exemplary embodiment of a router that utilizes a radix tree for route resolution, the contents of which is incorporated herein by reference in its entirety. Further details of a forwarding engine capable of applying operations to manipulate packet headers when forwarding packets is described in U.S. Pat. No. 9,106,581, entitled "PACKET FORWARDING PATH PROGRAMMING USING A HIGH-LEVEL DESCRIPTION LANGUAGE," the entire content of which is incorporated herein by reference.

Based on forwarding information 216, forwarding component 207 forwards packets received from inbound links 222A-222N to outbound links 224A-224N that correspond to next hops associated with destinations of the packets. U.S. Pat. No. 7,184,437 provides details on an exemplary embodiment of a router having a forwarding component that utilizes forwarding information for forwarding packets, the contents of which is incorporated herein by reference in its entirety. In one example, forwarding component 207 is a rich and dynamic shared forwarding plane, optionally distributed over a multi-chassis router. Moreover, forwarding component 207 may be provided by dedicated forwarding integrated circuits normally associated with high-end routing components of a network router.

The architecture of router 200 is shown for exemplary purposes only. The invention is not limited to this architecture. In other examples, router 200 may be configured in a variety of ways. In one example, some of the functionally of control unit 202 may be distributed within IFCs 220. In another example, control unit 202 may comprise a plurality of packet forwarding engines operated as slave routers.

Control unit 202 may be implemented solely in software, or hardware, or may be implemented as a combination of software, hardware, or firmware. For example, control unit 202 may include one or more processors which execute software instructions. In that case, the various software modules of control unit 202 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a first router within a data center, a route advertisement for a border gateway protocol (BGP) labeled unicast (LU) route that specifies a destination address of a second router within the data center that originated the BGP-LU route, a Multiprotocol Label Switching (MPLS) label and next hop data for reaching the second router, wherein the BGP-LU route further specifies a community attribute identifying a region within the data center in which the second router is located;
   responsive to determining that the region identified by the community attribute specified by the BGP-LU route matches a region in which the first router is located, allocating a label with the first router and modifying the route advertisement by rewriting the label specified within the route advertisement with the label allocated by the first router and rewriting the next hop data within the route advertisement to a network address assigned to the first router; and
   re-advertising, with the first router, the modified route advertisement within the data center.

2. The method of claim 1, further comprising, responsive to determining that the region identified by the community attribute specified by the BGP-LU route does not match the region in which the first router is located, re-advertising the route advertisement without modification.

3. The method of claim 1, wherein the data center comprises a service layer having compute nodes and a transport layer having a plurality of routers that provide point-to-point connectivity between the compute nodes, and wherein the first router is positioned within the transport layer, the method further comprising communicating the modified route advertisement for the BGP-LU route between the routers of the transport layer without communicating the modified route advertisement to the service layer of the data center.

4. The method of claim 3, further comprising:
   partitioning the transport layer into a plurality of regions; and
   assigning each of the partitions a respective community attribute that uniquely identifies the region.

5. The method of claim 3, wherein the second one of the routers is positioned at a border of the transport layer and the service layer of the data center, the method further comprising:
   receiving, with a third router positioned at the border of the transport layer and the service layer of the data center, the modified route advertisement for the BGP-LU route;
   updating a first route table to store the destination address of the second router and the label and next hop data for the BGP-LU route as rewritten in the route advertisement by the first router;
   receiving, with the third router and from the second router, a route advertisement advertising an Internet Protocol (IP)-based unicast route specifying the second router as a next hop for reaching a destination address of a first one of the compute nodes; and updating, with the third router, a second route table to store the IP-based unicast route.

6. The method of claim 5, further comprising:
   receiving, with the third router and from a second one of the compute nodes, a packet having the destination address of the first compute node;
   accessing the second route table to identify the second router as a next hop for the packet for the IP-based unicast route;
   accessing the first route table to identify the first one of the routers as a next hop within the transport layer for the BGP-LU route;
   constructing a tunnel packet to encapsulate the packet from the second one of the compute nodes with a label stack comprising at least the label allocated by the first router; and
   outputting the tunnel packet from the third router to the transport layer of the data center for delivery to the first one of the compute nodes.

7. The method of claim 5, wherein the IP-based unicast route comprises BGP IP unicast route.

8. A transport router of a transport layer within a data center, the router comprising:
   a control unit having at least one processor coupled to a memory; and
   a forwarding component configured to forward packets within the data center wherein the control unit is configured to receive a route advertisement for a border gateway protocol (BGP) labeled unicast (LU) route that specifies a destination address of a second router within the data center that originated the BGP-LU route, a Multiprotocol Label Switching (MPLS) label and next hop data for reaching the second router, wherein the LU route further specifies a community attribute identifying a region within the data center in which the second router is located;
   wherein the control unit is further configured to, responsive to determining that region identified by the community attribute specified by the BGP-LU route matches a region in which the first router is located, allocate a label, rewrite the label specified within the route advertisement with the allocated label, rewrite the next hop data within the route advertisement to a network address assigned to the router, and re-advertise the modified route advertisement within the transport layer of the data center.

9. The router of claim 8, wherein the router is further configured to, responsive to determining that region identified by the community attribute specified by the BGP-LU route does not match the region in which the first router is located, re-advertise the route advertisement within the transport layer without modification.

10. The router of claim 8,
wherein the data center comprises a service layer having compute nodes and a transport layer having a plurality of routers that provide point-to-point connectivity between the compute nodes, and wherein the first router is positioned within the transport layer,
and wherein the control unit is configured to communicate the modified route advertisement for the BGP-LU route between the routers of the transport layer without communicating the modified route advertisement to the service layer of the data center.

11. A system comprising:
a data center comprising a service layer having compute nodes and a transport layer having a plurality of routers that provide point-to-point connectivity between the compute nodes, wherein the transport layer is partitioned into a plurality of regions, each of the regions assigned a respective community attribute,
wherein interior routers of the transport layer are configured to executing a border gateway protocol (BGP) labeled unicast (LU) protocol to exchange route advertisements specifying BGP-LU routes, each of the BGP-LU routes specifying a destination address of one of the router that originated the route advertisement, a Multiprotocol Label Switching (MPLS) label, a next hop for reaching the originating router, and a community attribute identifying a region within the data center in which the originating router is located, and
wherein each of the routers within the transport layer is configured to construct a hierarchy of label switched paths (LSPs) within the transport layer by modifying the BGP-LU routes and re-advertising the modified BGP-LU routes when the region identified by the community attribute specified by the BGP-LU routes matches a region in which the re-advertising router is located, wherein the routers are configured to modify the BGP-LU routes by rewriting the label specified within the each of the BGP-LU routes with a label allocated by the re-advertising router and rewriting the next hop within the BGP-LU routes to a network address assigned to the re-advertising router.

12. The system of claim 11, wherein each of the routers within the transport layer is further configured to, responsive to determining that region identified by the community attribute specified by the BGP-LU route does not match the region in which the router is located, re-advertise the BGP-LU routes within the transport layer without modification.

13. The system of claim 11, wherein a set of the routers comprise edge routers position at a border of the service layer and the transport layer are configured to exchange BGP IP unicast routes specifying next hop data for reaching destination addresses of the compute nodes within the service nodes.

14. The system of claim 13,
wherein each of the edge routers maintain a first table storing the BGP-LU routes and a second table storing the BGP IP unicast routes, and
wherein each edge routers forward packets between the compute nodes by, for each of the packets:
accessing the second route table to identify one of the edge routers as a next hop for the packet for the IP-based unicast route;
accessing the first route table to identify one of the interior routers as a next hop within the transport layer for the LU route for reaching the identified one of the edge routers;
constructing a tunnel packet to encapsulate the packet from the second one of the compute nodes with a label stack comprising at least the label allocated by the identified one of the interior routers; and
outputting the tunnel packet to the transport layer of the data center.

15. A method comprising:
executing, with routers within a transport layer of a data center, a border gateway protocol (BGP) labeled unicast (LU) protocol to exchange route advertisements that each specify a destination address of a router that originated the route advertisement, a Multiprotocol Label Switching (MPLS) label, a next hop for reaching the originating router, and a community attribute identifying a region within the data center in which the originating router is located; and
constructing a hierarchy of label switched paths (LSPs) within the transport by modifying one or more of the BGP-LU route advertisements and re-advertising the BGP-LU route advertisements with each of the routers when the region identified by the community attribute specified by the BGP-LU route advertisements matches a region in which the re-advertising router is located, wherein modifying the BGP-LU advertisements comprises modifying the BGP-LU route advertisements by rewriting the label specified within each of the route advertisements with a label allocated by the re-advertising router and rewriting the next hop within each of the route advertisements to a network address assigned to the re-advertising router.

16. The method of claim 15, further comprising executing, with the routers of the transport layer that couple the transport layer of the data center to a service layer having compute nodes of the data center, a BGP IP protocol to exchange routes for reaching the compute nodes without executing the BGP IP protocol on the remaining routers of the transport layer.

* * * * *